May 26, 1925.  1,539,461

E. BREITLING

KEY RELEASING DEVICE FOR CASH REGISTERS AND CALCULATING MACHINES

Filed March 13, 1923  6 Sheets-Sheet 1

May 26, 1925.  
E. BREITLING  
KEY RELEASING DEVICE FOR CASH REGISTERS AND CALCULATING MACHINES  
Filed March 13, 1923  6 Sheets-Sheet 2

1,539,461

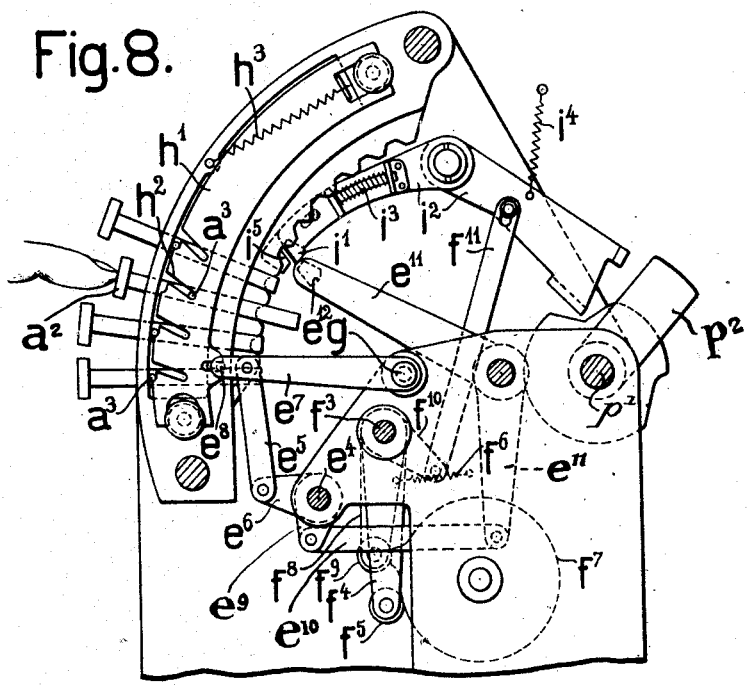
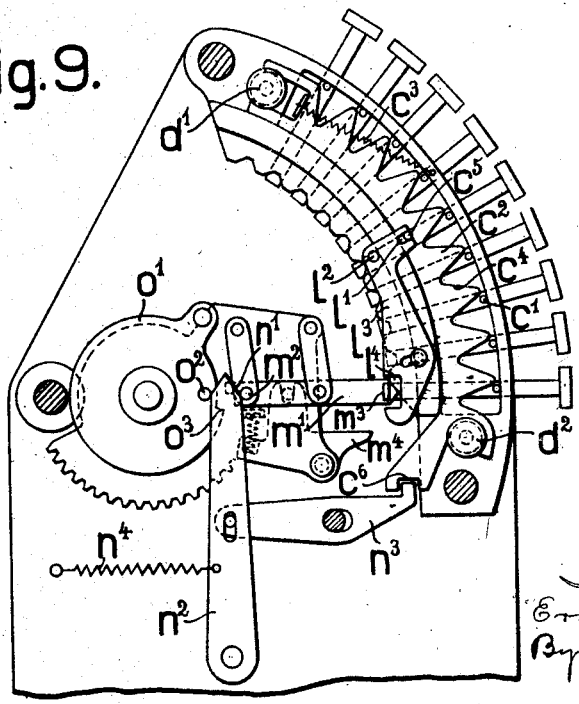

Patented May 26, 1925.

1,539,461

UNITED STATES PATENT OFFICE.

ERNST BREITLING, OF ESSEN-WEST, GERMANY, ASSIGNOR TO FRIED. KRUPP AKTIEN-GESELLSCHAFT, OF ESSEN-ON-THE-RUHR, GERMANY.

KEY-RELEASING DEVICE FOR CASH REGISTERS AND CALCULATING MACHINES.

Application filed March 13, 1923. Serial No. 624,808.

*To all whom it may concern:*

Be it known that I, ERNST BREITLING, residing at Essen-West, Germany, a citizen of the German Republic, have invented a certain new and useful Improvement in Key-Releasing Devices for Cash Registers and Calculating Machines, of which the following is a specification.

This invention relates to key releasing devices for cash registers and calculating machines of the kind comprising special keys designed to unlock the machine for operation or special keys designed to unlock the driving shaft of the machine in case the machine is operated electrically.

The invention has for its object to provide a device of the said character containing adjustable releasing levers which are adapted to be held in inoperative position as long as one of the special keys is depressed. If, therefore, the special key is kept depressed until the operation of the machine has been terminated, the set keys of the other key series will not be released, and the operation of the machine following a renewed depressing of the special key will produce the same registration as before. The invention thus renders it possible in a simple manner to repeat any desired number of times the registration of an amount once set.

Figure 1:
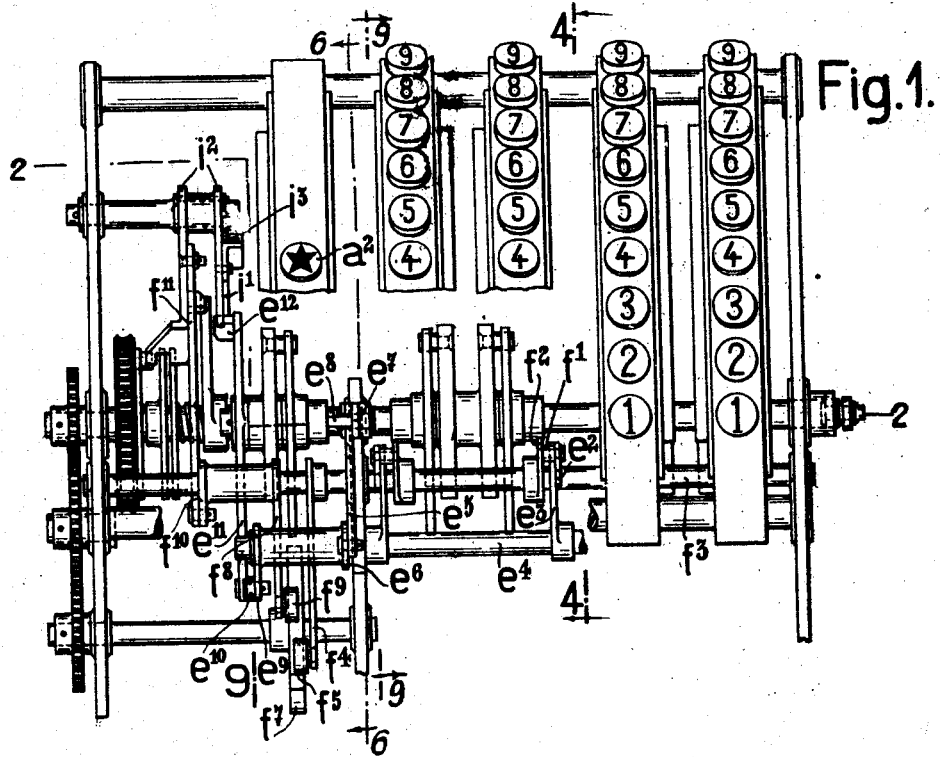
Figure 2:
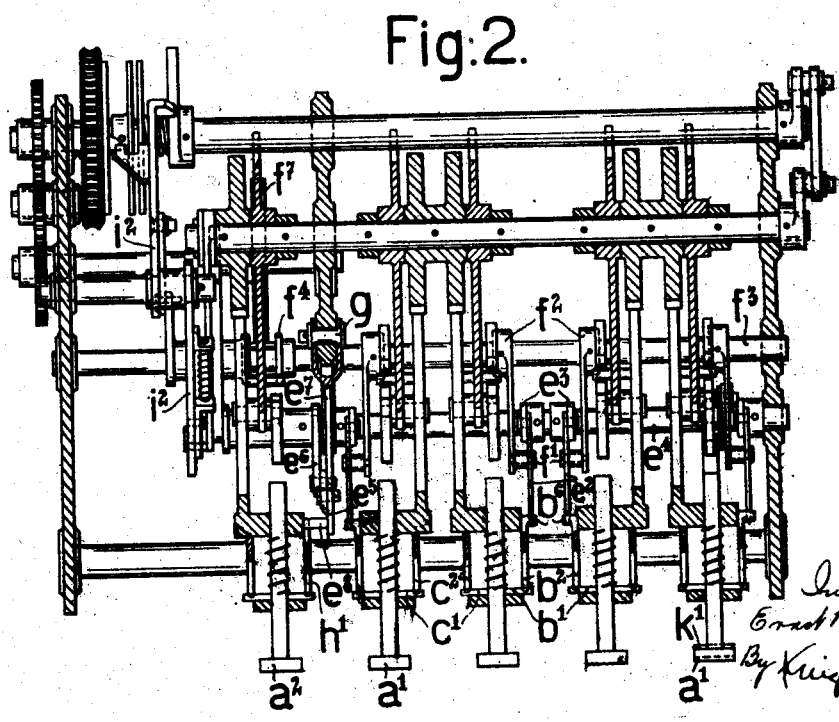
Figure 3:
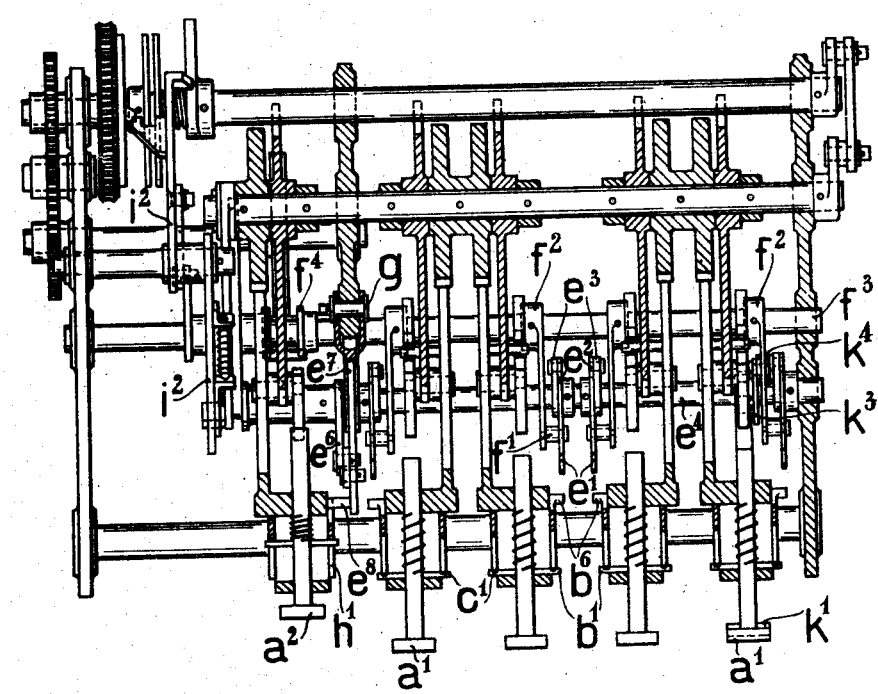
Figure 4:
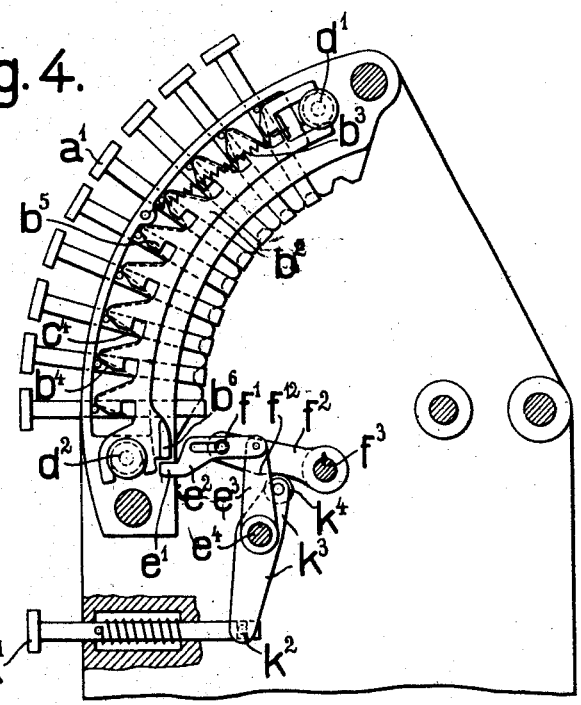
Figure 5:
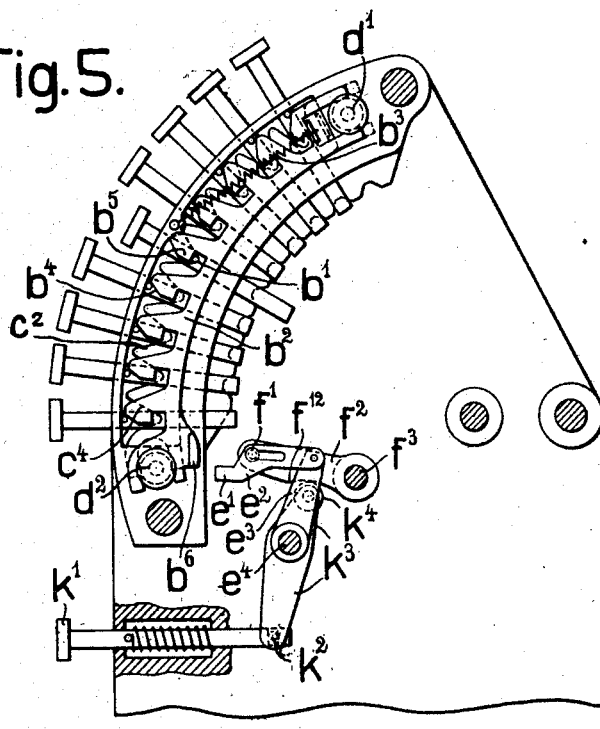
Figure 6:
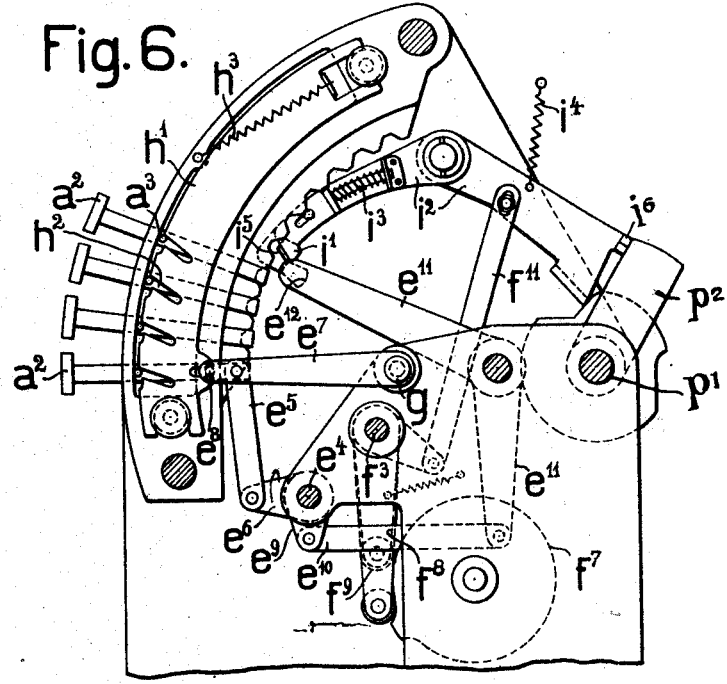
Figure 7:
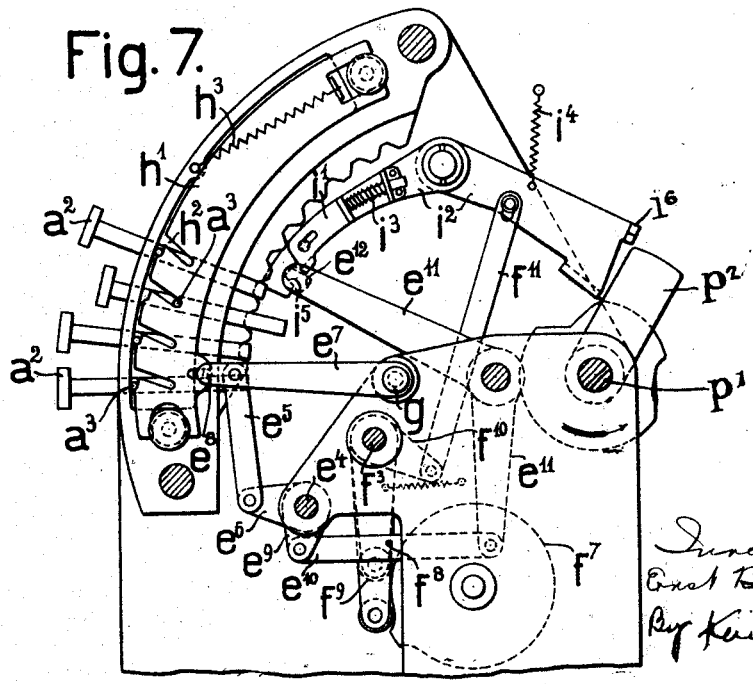
Figure 10:
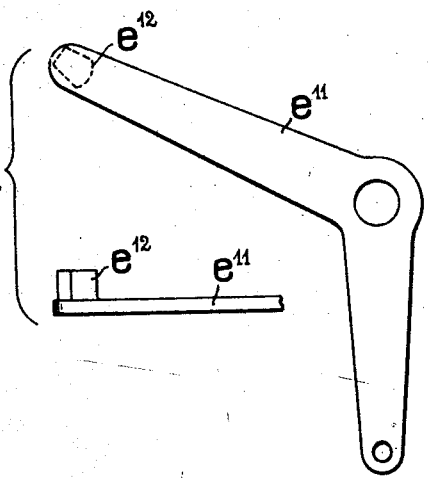
Figure 11:
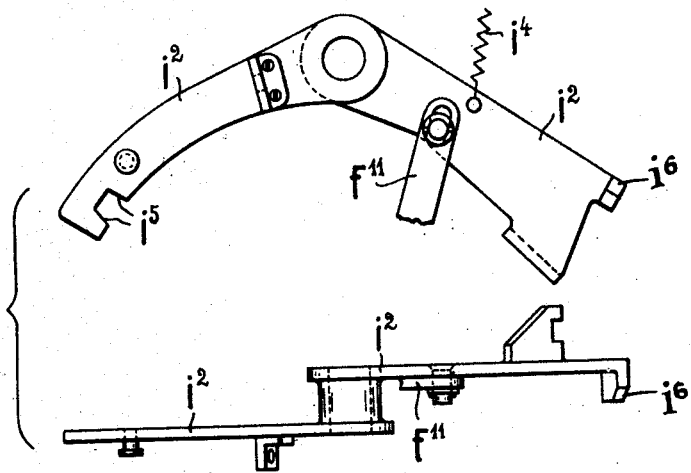
Figure 12:
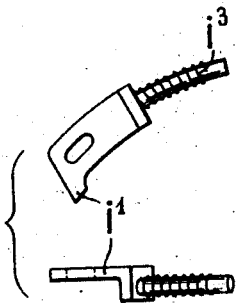

An embodiment of the subject matter of the invention is illustrated in the accompanying drawings in which Fig. 1 is a front elevation of a portion of a cash register provided with the new device, Fig. 2 is a horizontal sectional view taken on line 2—2 of Fig. 1, Fig. 3 is a view similar to Fig. 2 some parts being in another position, Fig. 4 is a section along the line 4—4 of Fig. 1, looking in the direction of the arrows, Fig. 5 is a view similar to Fig. 4, some parts being in another position, Fig. 6 is a section along the line 6—6 of Fig. 1, looking in the direction of the arrows, Figs. 7 and 8 are views corresponding to Fig. 6, some parts being in a different position, Fig. 9 is a section along the line 9—9 of Fig. 1, looking in the direction of the arrows, and Figs. 10 to 12 show details on an enlarged scale.

Each of the amount keys $a^1$ is provided with two pins $b^1$ and $c^1$ and every series of amount keys is provided with two key locking plates $b^2$ and $c^2$ the oblique faces $b^4$ and $c^4$ of which are liable to be acted upon by the pins $b^1$ and $c^1$. The key locking plates are guided each by slots at two rollers $d^1$, $d^2$ mounted in the key-banks and are drawn downwards by means of springs $b^3$ and $c^3$. Upon depressing the keys, the locking plates are moved upwards until the locking plate $b^2$ will snap back under the spring action, its respective nose $b^5$ gripping over the pin $b^1$ (Fig. 5) and locking the depressed key, the pin $c^1$ of which, will hold the locking plate $c^2$ in the elevated position. During the upward movement of the locking plates $c^2$, same will in a well-known way act on and release the setting disks of the amount key series which are locked in the zero position.

To this end, a pin $c^5$ (Fig. 9) of the locking plate $c^2$ engages a slot $l^1$ of a bell-crank lever $l^3$ which is mounted for rotation on a fixed shaft $l^2$ and provided with a notch $l^4$ adapted to be engaged by the front end of a setting bolt $m^1$. When the setting bolt $m^1$ moves downward, it will strike by its pin $m^2$ against an oblique face $n^1$ of a lever $n^2$ and be caused thereby to be shifted forwardly and thrown out of the path of the swinging driver disk $o^1$. If no key of the respective series is depressed, the notch $l^4$ of the bell-crank lever $l^3$ which has not been rocked, will embrace a pin $m^3$ of the setting bolt. Besides, a notch $c^6$ of the locking plate $c^2$ will lock a latch $n^3$ which is pivotally connected with the lever $n^2$, so that the lever $n^2$ is prevented from releasing the setting bolt when the pin $o^2$ of the driver disk $o^1$ has been disengaged from the lever $n^2$ during the first part of the upward movement of the disk $o^1$. When an amount key is depressed and the locking plate $c^2$ caused thereby to move upwards, the bell-crank lever $l^3$ with its notch $l^4$ will be thrown out of the path of the pin $m^3$ of the setting bolt $m^1$ and the latch $n^3$ released, so that upon the driver disk $o^1$ moving upwards the lever $n^2$ will follow the pull of a spring $n^4$ attached to it and release the setting bolt $m^1$ which will now be engaged by the offset $o^3$ of the driver disk $o^1$ and carried along by the same until its feeler $m^4$ will strike against the toe of the depressed key. The construction and operation of this feeler lever $m^4$ is shown in detail in U. S. Letters Patent No. 1,477,420, granted to me December 11, 1923.

The release of the amount keys $a^1$ is performed by means of the device that will be presently described. The locking plates $b^2$ are provided with a projection $b^6$ adapted to cooperate with the end $e^1$ of the releasing levers $e^2$. The latter are pivotally connected with arms $e^3$ which are fixed on a shaft $e^4$, and guided by means of an oblong slot at a pin $f^1$ on an arm $f^2$. The arms $f^2$ which are fixed on a shaft $f^3$ and which correspond to the ordinary releasing levers, are adapted to be rocked through the intermediary of an arm $f^4$ of the said shaft which arm carries a roller $f^5$ (Figs. 1 and 8) adapted to cooperate with a cam disk $f^7$ under the action of a spring $f^6$. When the releasing levers $e^2$ are in their operative position (Fig. 4) during the said rocking movement, the key locking plates $b^2$ will be lifted and the set amount keys $a^1$ released. However, the releasing levers $e^2$ are at times adjusted in such a manner as to prevent their ends $e^1$ from acting on the amount key locking plate $b^2$. With regard to this end, the shaft $e^4$ is provided with an arm $e^6$ which is pivotally connected by a link $e^5$ with a lever $e^7$ mounted for rotation on a fixed shaft $g$ and provided with a pin $e^8$ which engages a slot of a locking plate $h^1$ for the special keys. Upon depressing one of the special keys $a^2$ its pin $a^3$ will enter into one of the oblique slots $h^2$ of the locking plate $h^1$ and move the same upwards contrary to the action of the spring $h^3$. This movement will be transmitted by the intermediary of the lever $e^7$, link $e^5$ and arm $e^6$ to the shaft $e^4$ (Fig. 7) causing the shaft to be rotated and the releasing levers $e^2$ to be thrown out of operative position by the arms $e^3$ of the shaft $e^4$ (Fig. 5). At the end of an operation the machine is always locked, since a locking lever provided with a lug $i^6$ against which an arm $p^2$ fixed on the drive shaft $p'$ abuts, prevents a rotation of the drive shaft $p'$. At the beginning of a new operation, by the depression of the special key and the thereby permitted rotation of shaft $e^4$, the locking lever $i^2$ is also released so that it can be swung into the position shown in Fig. 7 under the influence of the spring $i^4$. The lug $i^6$ of the locking lever $i^2$ is thus outside the path of the arm $p^2$ so that the shaft $p'$ can be rotated in the direction of the arrow, Fig. 7. The release of the locking lever $i^2$ occurs through the intermediary of an arm $e^9$ fixed on the shaft $e^4$. This arm $e^9$ of the shaft $e^4$ is pivotally connected by a link $e^{10}$ with a bell-crank lever $e^{11}$ (see, more particularly, Figs. 6, 7 and 10) which when rocked will cause a latch $i^1$ (Fig. 12) of the cash register locking lever $i^2$ (Fig. 11) to be pressed backwards (Fig. 7) contrary to the action of a spring $i^3$ by the projection $e^{12}$ of the lever $e^{11}$, so that the cash register locking lever $i^2$ will likewise be allowed to rock under the action of a spring $i^4$. A notch $i^5$ of the cash register locking lever will now engage the projection $e^{12}$ and lock the bell-crank lever $e^{11}$, whereby the key locking plate $h^1$ and the depressed special key $a^2$ are likewise locked through the intermediary of the parts $e^4$ to $e^{10}$. The release of the special key takes place when turning back the locking lever $i^2$ a small extent behind its normal position (Fig. 8) the notch $i^5$ releasing the projection $e^{12}$ and the parts $h^1$ and $e^4$ to $e^{11}$, which have been actuated by the depression of the special key, being returned into inoperative position under the action of the spring $h^3$ and the release of the depressed special key effected.

To this end, the shaft $f^3$ carries a freely rotatable lever arm $f^8$ (see also Fig. 1) having a roller $f^9$ which cooperates too with the cam disk $f^7$. Rigidly connected with the lever arm $f^8$ is another arm $f^{10}$ having pivoted to it a link $f^{11}$ which is provided with an oblong slot engaged by a pin of the cash register locking lever $i^2$. When the arm $f^8$ is pushed aside by the cam of the disk $f^7$, the locking lever $i^2$ is moved into the position according to Fig. 8 contrary to the spring $i^4$, so that the projection $e^{12}$ will get out of the path of the latch $i^1$ and this latch will be allowed to snap back into its initial position. As soon as the cam of the disk $f^7$ during the continued movement will no longer act on the arm $f^8$, the locking lever $i^2$ is moved back by the spring $i^4$ until the spring influenced latch $i^1$ which has snapped back, will meet the projection $e^{12}$ which has been returned into its initial position (underneath the latch $i^1$) by the action of the spring $h^3$ through the intermediary of the parts $h^1$, $e^8$, $e^7$, $e^5$, $e^6$, $e^4$, $e^9$, $e^{10}$, $e^{11}$. At the same time, the releasing levers $e^2$ are returned into their operative position by the shaft $e^4$ and the arms $e^3$.

The cam of the disk $f^7$ will then enter into the range of the roller $f^5$ of the arm $f^4$ the rocking movement of which will impart a swinging movement to the shaft $f^3$ and all its releasing levers $e^2$ for the amount key series so that the amount key locking plates $b^2$ will be lifted and the depressed amount keys released. If, however, the special key $a^2$ is held depressed, the shaft $e^4$, when rocking the releasing levers, will not yet have been rotated again into the position of rest nor will the releasing levers $e^2$ have been returned into the operative position; their rocking movement will therefore be without any influence on the locking plates $b^2$ or the amount keys $a^1$.

If a special key $a^2$ has not yet been depressed, the release of the amount keys which have already been set, may be effected manually by means of a releasing key $k^1$ the slotted toe of which is engaged by a pin $k^2$ of a two-armed lever $k^3$. This lever carries at its free end a roller $k^4$ which, upon depressing the releasing key $k^1$, will act on a nose $f^{12}$ of one of the arms $f^2$ and move the latter upwards, thereby causing the releasing levers $e^2$ moved by all of the arms $f^2$ to lift the amount key locking plates $b^2$ so that the amount keys $a^1$ are released.

It is to be understood that series of keys indicating kinds of goods or seller's keys may be connected with the described releasing device in the same manner as the amount key series.

The operation of the described arrangement is as follows:

After setting the amount by the keys $a^1$, a special key $a^2$ is depressed and thereby a rocking movement imparted to the bell-crank lever $e^{11}$ which is positively connected with the locking plate $h^1$ of the special keys, whereupon the cash register locking lever $i^2$ is swung out of its locking position by the spring $i^4$. The cash register is thereby unlocked. The key locking plate $h^1$ and along with the same the depressed special key $a^2$ are locked by the projection $e^{12}$ of the bell-crank lever $e^{11}$ snapping into the liberated notch $i^5$ of the locking lever $i^2$. The rocking of the special key locking plate $h^1$ is accompanied by a movement of the releasing levers $e^2$ which thereby are brought into inoperative position (Fig. 5) until the release of the special key which usually takes place prior to the releasing of the other keys. If, however, the special key $a^2$ is held depressed until the movement for releasing the other keys by the cam disk $f^7$ has taken place, this release cannot take place because the releasing levers $e^2$ are still in their inoperative position when executing the rocking movement. If, now, the special key is released, when it is again depressed the following operation of the cash register will produce the same registration as in the previous operation.

Claims.

1. A key releasing device for cash registers and calculating machines provided with amount keys and special keys designed to unlock the machine for operation, comprising releasing means for the amount keys and means connecting said releasing means to said special keys whereby said releasing means is held inoperative as long as one of said special keys is depressed.

2. A key releasing device for cash registers and calculating machines provided with amount keys and special keys designed to unlock the machine for operation, comprising releasing means for said amount keys, locking means for said special keys displaceable upon the depression of a special key, and means connecting said locking means to said releasing means whereby said releasing means is held in inoperative position during the depression of a special key.

3. In a key releasing device for cash registers and calculating machines provided with amount keys and special keys designed to unlock the machine for operation comprising locking means for said special keys, displaceable upon depression of a special key, releasing levers for said amount keys provided with adjustable parts, a shaft for said releasing levers, a second shaft parallel with said first mentioned shaft, arms on said second shaft pivotally connected to the adjustable parts of said releasing levers, and means positively connecting said last mentioned shaft with the locking means for said special keys, whereby said releasing levers are held inoperative during the continued depression of a special key, thus enabling duplicate registrations of the amounts previously set on the amount keys during a continued operation of the machine.

The foregoing specification signed at Cologne, Germany, this 9th day of February, 1923.

ERNST BREITLING.